US008660078B2

(12) United States Patent
Song et al.

(10) Patent No.: US 8,660,078 B2
(45) Date of Patent: Feb. 25, 2014

(54) DATA RADIO BEARER (DRB) ENHANCEMENTS FOR SMALL DATA TRANSMISSIONS APPARATUS, SYSTEMS, AND METHODS

(75) Inventors: Bongyong Song, San Diego, CA (US); Osok Song, San Diego, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 13/368,174

(22) Filed: Feb. 7, 2012

(65) Prior Publication Data

US 2013/0201924 A1 Aug. 8, 2013

(51) Int. Cl.
*H04W 4/00* (2009.01)
*H04L 12/26* (2006.01)
*H04L 12/28* (2006.01)
*H04W 72/00* (2009.01)

(52) U.S. Cl.
USPC ....... 370/329; 370/252; 370/395.21; 455/450

(58) Field of Classification Search
None
See application file for complete search history.

(56) References Cited

U.S. PATENT DOCUMENTS

| | | | |
|---|---|---|---|
| 7,193,966 B2 | 3/2007 | Gupta et al. | |
| 7,471,654 B2 | 12/2008 | Mueckenheim et al. | |
| 8,391,239 B2 * | 3/2013 | Tenny et al. | 370/331 |
| 2005/0288062 A1 | 12/2005 | Hammerschmidt et al. | |
| 2007/0189205 A1 | 8/2007 | Terry et al. | |
| 2008/0123660 A1 | 5/2008 | Sammour et al. | |
| 2009/0225711 A1 | 9/2009 | Sammour et al. | |
| 2010/0103862 A1 | 4/2010 | Ulupinar et al. | |
| 2010/0182963 A1 | 7/2010 | Fischer et al. | |
| 2010/0329135 A1 | 12/2010 | Pelletier et al. | |
| 2011/0007671 A1 | 1/2011 | Yu | |
| 2011/0069837 A1 | 3/2011 | Song et al. | |
| 2011/0075675 A1 | 3/2011 | Koodli et al. | |
| 2012/0250601 A1 * | 10/2012 | Choi et al. | 370/315 |
| 2012/0307709 A1 * | 12/2012 | Ostergaard et al. | 370/315 |
| 2013/0017779 A1 | 1/2013 | Song et al. | |
| 2013/0044708 A1 * | 2/2013 | Kim et al. | 370/329 |
| 2013/0051326 A1 | 2/2013 | Jeyatharan et al. | |
| 2013/0100841 A1 * | 4/2013 | Liang et al. | 370/252 |
| 2013/0100895 A1 * | 4/2013 | Aghili et al. | 370/329 |

FOREIGN PATENT DOCUMENTS

| | | |
|---|---|---|
| EP | 2416521 A1 | 2/2012 |
| WO | 2008024215 A2 | 2/2008 |
| WO | 2008041816 A1 | 4/2008 |
| WO | 2010028690 A1 | 3/2010 |
| WO | 2010079984 A2 | 7/2010 |
| WO | 2011121580 A2 | 10/2011 |
| WO | 2011135800 A1 | 11/2011 |

OTHER PUBLICATIONS

3GPP TR 23.888 V1.5.0 (Oct. 2011) 3rd Generation Partnership Project; Technical Specification Group Services and System Aspects; System Improvements for Machine-Type Communications; (Release 11).

(Continued)

*Primary Examiner* — Clemence Han
(74) *Attorney, Agent, or Firm* — Jeffrey D. Jacobs (57) ABSTRACT

A method of transmitting data packets with a wireless communication device includes requesting a preconfigured data radio bearer (DRB) from a base station during a connection request; receiving the preconfigured DRB from the base station in response to the request; and providing security configuration information to a network control entity that provides the security configuration information to the base station.

39 Claims, 6 Drawing Sheets

(56) References Cited

OTHER PUBLICATIONS

International Search Report and Written Opinion—PCT/US2013/022248—ISA/EPO—Jun. 26, 2013.

LG Electronics Inc: "Issues in Integrity Protection on DRB", 3GPP Draft; R2-106503 Issues in Integrity Protection on DRB, 3rd Generation Partnership Project (3GPP), Mobile Competence Centre; 650, Route Des Lucioles; F-06921 Sophia-Antipolis Cedex; France, vol. RAN WG2, No. Jacksonville, USA; 20101115, Nov. 9, 2010, XP050492304, [retrieved on Nov. 9, 2010] * section 2 *.

* cited by examiner

DATA RADIO BEARER (DRB) ENHANCEMENTS FOR SMALL DATA TRANSMISSIONS APPARATUS, SYSTEMS, AND METHODS

BACKGROUND

1. Field

Various embodiments generally relate to communication, and specific embodiments relate to techniques for supporting communication in a wireless communication system.

2. Related Art

Wireless communication systems are widely deployed to provide various communication content, such as voice, video, packet data, messaging, broadcast, and/or the like. These wireless systems may be multiple-access systems capable of supporting multiple users by sharing the available system resources. Examples of such multiple-access systems include code division multiple access (CDMA) systems, time division multiple access (TDMA) systems, frequency division multiple access (FDMA) systems, orthogonal FDMA (OFDMA) systems, and single-carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. It may be desirable to efficiently support communication for the UEs.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA 2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, FlashOFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "$3^{rd}$ Generation Partnership Project" (3GPP). CDMA 2000 is described in documents from an organization named "$3^{rd}$ Generation Partnership Project 2" (3GPP2). These various radio technologies and standards are known in the art.

Figure 1:
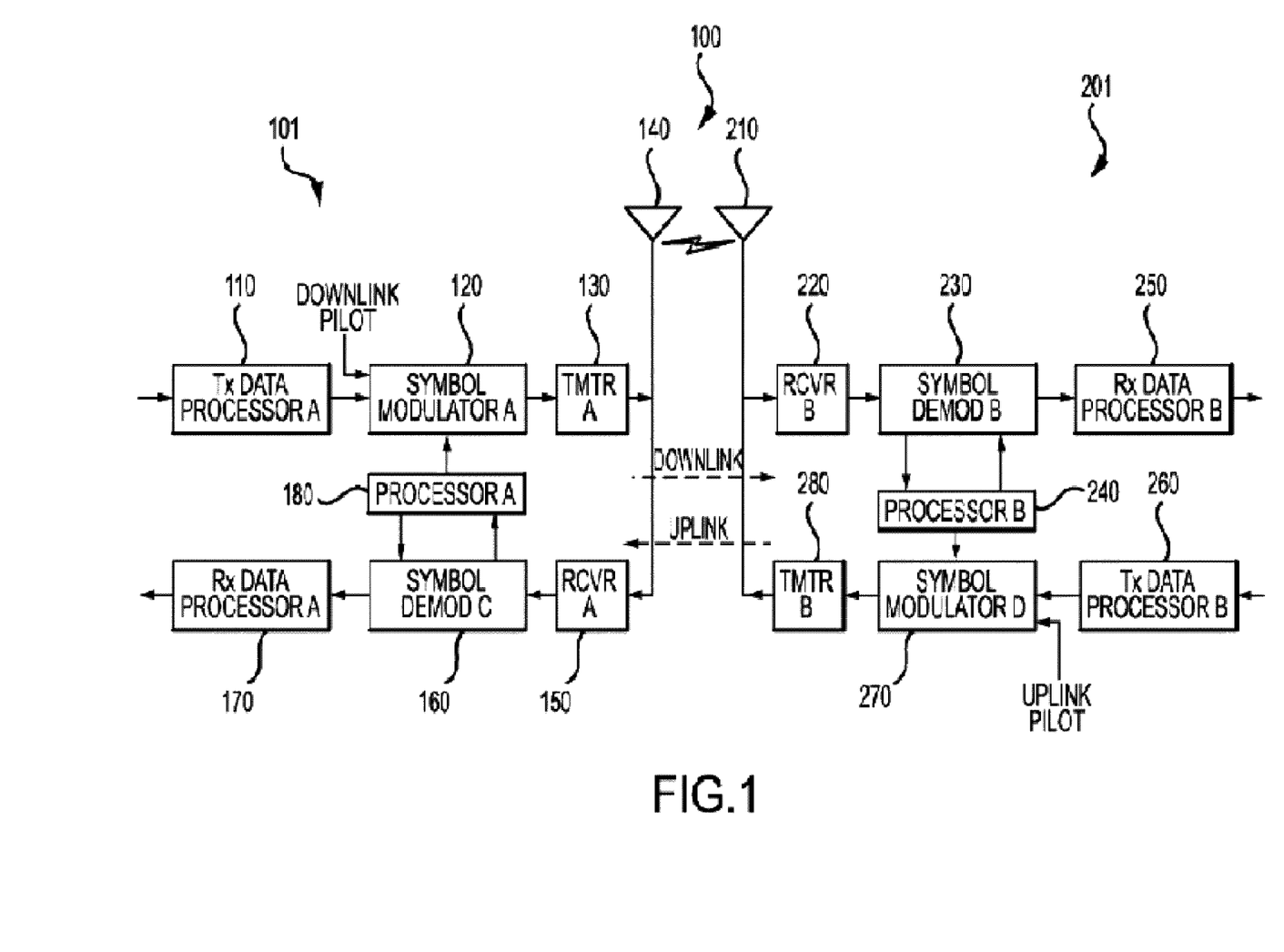
FIG. 1 is a block diagram illustrating a network environment in accordance with various embodiments of the disclosure.

FIG. 1 is a block diagram illustrating a network environment 100 in accordance with various embodiments of the disclosure. One skilled in the art would understand that the network environment 100 illustrated in FIG. 1 may be implemented in a frequency division multiple access (FDMA) environment, an orthogonal frequency division multiple access (OFDMA) environment, a code division multiple access (CDMA) environment, a wideband code division multiple access (WCDMA) environment, a time division (TDMA) environment, a spatial division multiple access (SDMA) environment, or any other suitable wireless environment.

The network environment 100 includes a base station 101 (e.g., eNodeB, NodeB, etc.) and a user equipment or UE 201. According to various embodiments, the UE 201 is a wireless communication device. In a downlink leg, the base station 101 (e.g., base station) includes a transmit (TX) data processor A 110 that accepts, formats, codes, interleaves, and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In some embodiments, the symbol modulator A 120 is in communication with processor A 180 which provides configuration information. The symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink (DL) pilot symbol or a signal value of zero. The downlink pilot symbols may be sent continuously in each symbol period. In some embodiments, the downlink pilot symbols are frequency division multiplexed (FDM). In other embodiments, the downlink pilot symbols are orthogonal frequency division multiplexed (OFDM). In yet other embodiments, the downlink pilot symbols are code division multiplexed (CDM). In some embodiments, the transmitter unit A 130 receives and converts the stream of symbols into one or more analog signals and further conditions, for example, amplifies, filters, and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In some embodiments, the receiver unit B 220 conditions, for example, filters, amplifies, and frequency downconverts the analog downlink signal to a first conditioned signal. The first conditioned signal is then sampled. The receiver unit B 220 is in communication with a symbol demodulator B 230. The symbol demodulator B 230 demodulates the first conditioned and sampled signal (e.g., data symbols) outputted from the receiver unit B 220. One skilled in the art would understand that an alternative is to implement the sampling process in the symbol demodulator B 230. The symbol demodulator B 230 is in communication with a processor B 240. The processor B 240 receives downlink pilot symbols from the symbol demodulator B 230 and performs channel estimation on the downlink pilot symbols. In some embodiments, the channel estimation is the process of characterizing the current propagation environment. The symbol demodulator B 230 receives a frequency response estimate for the downlink leg from the processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves, and/or decodes the data symbol estimates on the downlink path to recover the traffic data. In some embodiments, the processing by the symbol demodulator B 230 and the RX data processor B 250 is complementary to the processing by the symbol modulator A 120 and TX data processor A 110, respectively.

In an uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In some embodiments, the symbol modulator D 270 is in communication with the processor B 240 which provides configuration information. The symbol modulator D 270 is in communication with a transmitter unit B 280.

Each symbol to be transmitted may be a data symbol, an uplink pilot symbol, or a signal value of zero. The uplink pilot symbols may be sent continuously in each symbol period. In some embodiments, the uplink pilot symbols are frequency division multiplexed (FDM). In other embodiments, the uplink pilot symbols are orthogonal frequency division multiplexed (OFDM). In yet other embodiments, the uplink pilot symbols are code division multiplexed (CDM). In some embodiments, the transmitter unit B 280 receives and converts the stream of symbols into one or more analog signals and further conditions, for example, amplifies, filters, and/or frequency upconverts the analog signals, to generate an analog uplink signal suitable for wireless transmission. The analog uplink signal is then transmitted through the antenna 210.

The analog uplink signal from the UE 201 is received by the antenna 140 and processed by a receiver unit A 150 to obtain samples. In some embodiments, the receiver unit A 150 conditions, for example, filters, amplifies, and frequency downconverts the analog uplink signal to a second conditioned signal. The second conditioned signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. The processor A 180 performs channel estimation for each active terminal transmitting on the uplink leg. In some embodiments, multiple terminals may transmit pilot symbols concurrently on the uplink leg on their respective assigned sets of pilot subbands where the pilot subband sets may be interlaced.

The processor A 180 and the processor B 240 direct (i.e., control, coordinate or manage, etc.) operation at the base station 101 (e.g., base station) and at the UE 201, respectively. In some embodiments, either or both the processor A 180 and processor B 240 are associated with one or more memory units (not shown) for storing of program codes and/or data. In some embodiments, either or both the processor A 180 or the processor B 240 or both perform computations to derive frequency and impulse response estimates for the uplink leg and downlink leg, respectively.

In some embodiments, the network environment 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In some embodiments, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
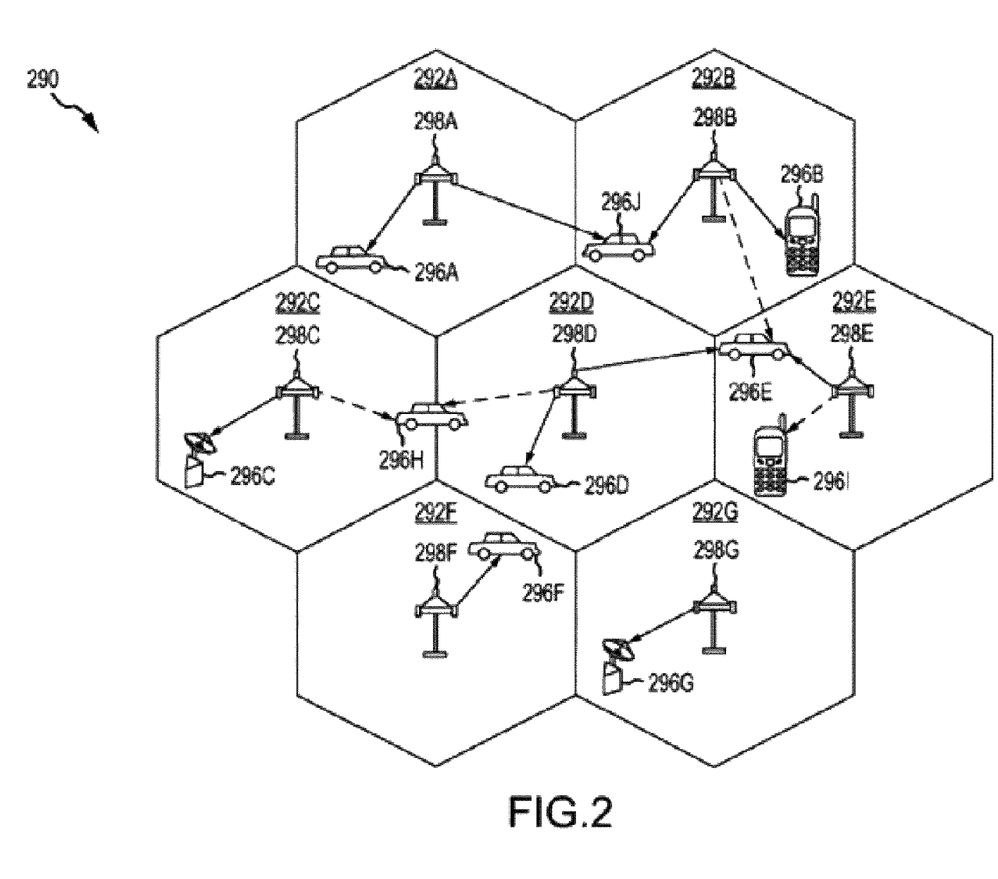
FIG. 2 illustrates a wireless communications system that supports a plurality of users in accordance with various embodiments of the disclosure.

FIG. 2 illustrates an example of a wireless communications system 290 that supports a plurality of users. In FIG. 2, reference numerals 292A to 292G refer to cells, reference numerals 298A to 298G refer to base stations (e.g., eNodeB), and reference numerals 296A to 296J refer to User Equipments (UE). Cell size may vary. With reference to FIGS. 1 and 2, in particular implementations, one or more of the base stations 298A-298G may be or include one or more components of the base station 101 and/or one or more of the UEs 296A-296J may be or include one or more components of the UE 201.

Any of a variety of algorithms and methods may be used to schedule transmissions in the wireless communications system 290. The wireless communications system 290 provides communication for a number of cells 292A through 292G, each of which is serviced by the corresponding base station 298A through 298G, respectively.

In various embodiments, a technique is provided by which a very large number of UEs (e.g., mobile devices) may be attached to a wireless network in a network-initiated manner. In some embodiments, the UEs maintain very low duty cycle traffic and are mostly stationary. In some embodiments, instead of being attached to the wireless network over a long period of time, a technique disclosed in the present disclosure employs a single attachment step, the establishment of a long term identifier (LTID) for the UE, and the storage of the coverage area, or set of sectors, in which the UE is located. Subsequently, the UE can completely detach itself from the wireless network and begin listening to paging indicators that are positioned in time slots, or time instances, that are a function of the LTID.

Various embodiments relate to a process for initiating the attachment of a UE from the wireless network side. Some embodiments include a mechanism for paging of UEs that are currently not registered in a radio access network or a core network of a wireless network. A potential advantage is that a large number of very low duty cycle UEs may be connected to a wireless network whenever the wireless network detects a need for data transfer between the UE and the wireless network.

In various embodiments, for some applications using machine-to-machine (M2M) communications, a very large number of UEs (e.g., mobile devices) may have to be connected to the wireless network with each UE generating data traffic with a fairly low duty cycle. One skilled in the art would understand that an example of a UE, such as an M2M device (or machine-type communication (MTC) device) is a mobile device. In some embodiments, mobile devices used for M2M applications are known as M2M devices. Examples for such applications include smart meters, building monitoring and safety systems, smart vending machines, eHealth for disease management, remote monitoring of industrial machines or installations or M2M applications that rely on battery powered mobile devices without frequent recharging. Mobile devices using M2M generally only exchange small data packets while a wireless connection is established. However, if a large number of such M2M devices make connections, the aggregate load on the wireless network may become significant even for small data transmissions. Minimizing overhead for each individual connection, therefore, may reduce the aggregate load on the wireless network.

Figure 3:
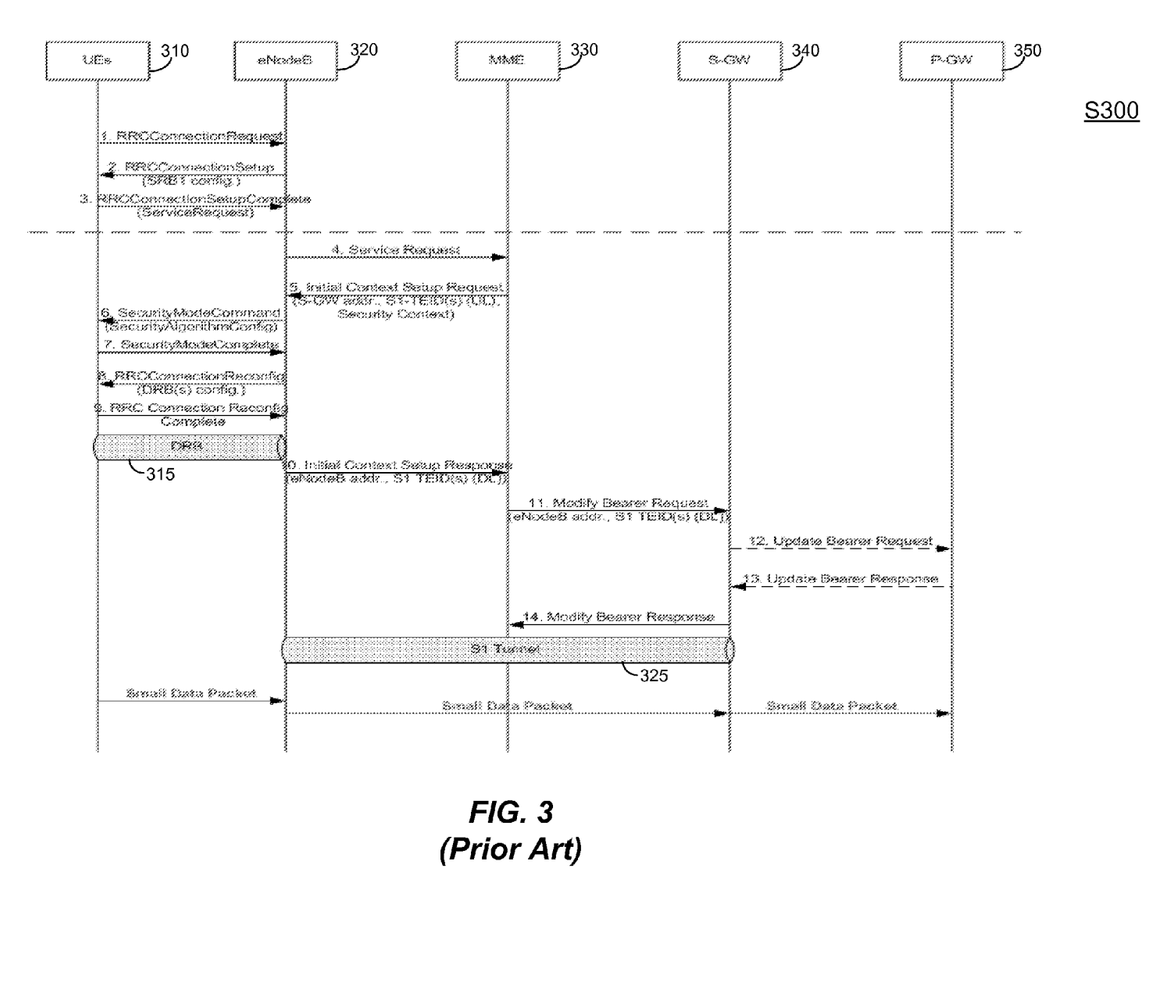
FIG. 3 illustrates a prior art call flow for evolved packet system (EPS) bearer small data transmission.

FIG. 3 illustrates a prior art call flow S300 for evolved packet system (EPS) bearer small data transmission. With reference to FIGS. 1-3, at step 1, a user equipment (UE) 310 (which, for instance, may be similar to or include one or components of the UE 201 and/or the UEs 296A-296J) sends a radio resource control (RRC) Connection Request message to a base station (which, for instance, may be similar to or include one or more components of the base station 101 and/or the base stations 298A-298G), such as (but not limited to) an eNodeB 320 or the like. According to various embodiments, the UE 310 is a wireless communication device. In particular embodiments, the UE 410 is a machine-type communication (MTC) device.

At step 2, the eNodeB 320 sends an RRC Connection Setup message, which includes configuration information for a signal radio bearer (SRB), to the UE 310. At step 3, the UE 310 sends an RRC Connection Setup Complete message, which includes a Service Request, to the eNodeB 320.

At step 4, the eNodeB 320 forwards a Service Request message (corresponding to the Service Request encapsulated in the RRC Connection Setup Complete message) to a network control entity, such as (but not limited to) a mobility management entity (MME) 330 or the like. At step 5, the MME 330 sends an Initial Context Setup Request message to the eNodeB 320. The Initial Context Setup Request message includes information such as address for a Serving Gateway (S-GW) 340, S1 tunnel identification for uplink of an S1 tunnel 325, and security context information. The security context information is determined by the MME 330 and used for the access stratum (AS) communications between the UE 310 and the eNodeB 320.

At step 6, the eNodeB 320 sends a Security Mode Command message, which includes a security algorithm configuration, to the UE 310. At step 7, the UE 310 sends a Security Mode Complete message to the eNodeB 320.

At step 8, the eNodeB 320 sends an RRC Connection Reconfig message, which includes configuration information for one or more data radio bearers (DRBs), to the UE 310. At step 9, the UE 310 sends an RRC Connection Reconfig Complete message to the eNodeB 320 to establish one or more DRBs 315.

At step 10, the eNodeB 320 sends an Initial Context Setup Response message to the MME 330. The Initial Context Setup Response message includes information such as the address of the eNodeB 320 and S1 tunnel identification for downlink of the S1 tunnel 325. At step 11, the MME 330 sends a Modify Bearer Request message to the S-GW 340. The Modify Bearer Request message includes information such as the address of the eNodeB 320 and S1 tunnel identification for downlink of the S1 tunnel 325. At step 12, the S-GW 340 sends an Update Bearer Request message to the P-GW 350. At step 13, the P-GW 350 sends an Update Bearer Response message to the S-GW 340. At step 14, the S-GW 340 sends a Modify Bearer Response message to the MME 330 to establish the S1 tunnel 325 between the eNodeB 320 and the S-GW 340.

It should be noted that a fair number of messages are exchanged between different nodes to establish a DRB even if the DRB is only to be used for small data transmission. Accordingly, for small data transmissions, streamlining the DRB establishment procedure, as discussed in the disclosure, may be beneficial.

Figure 4:
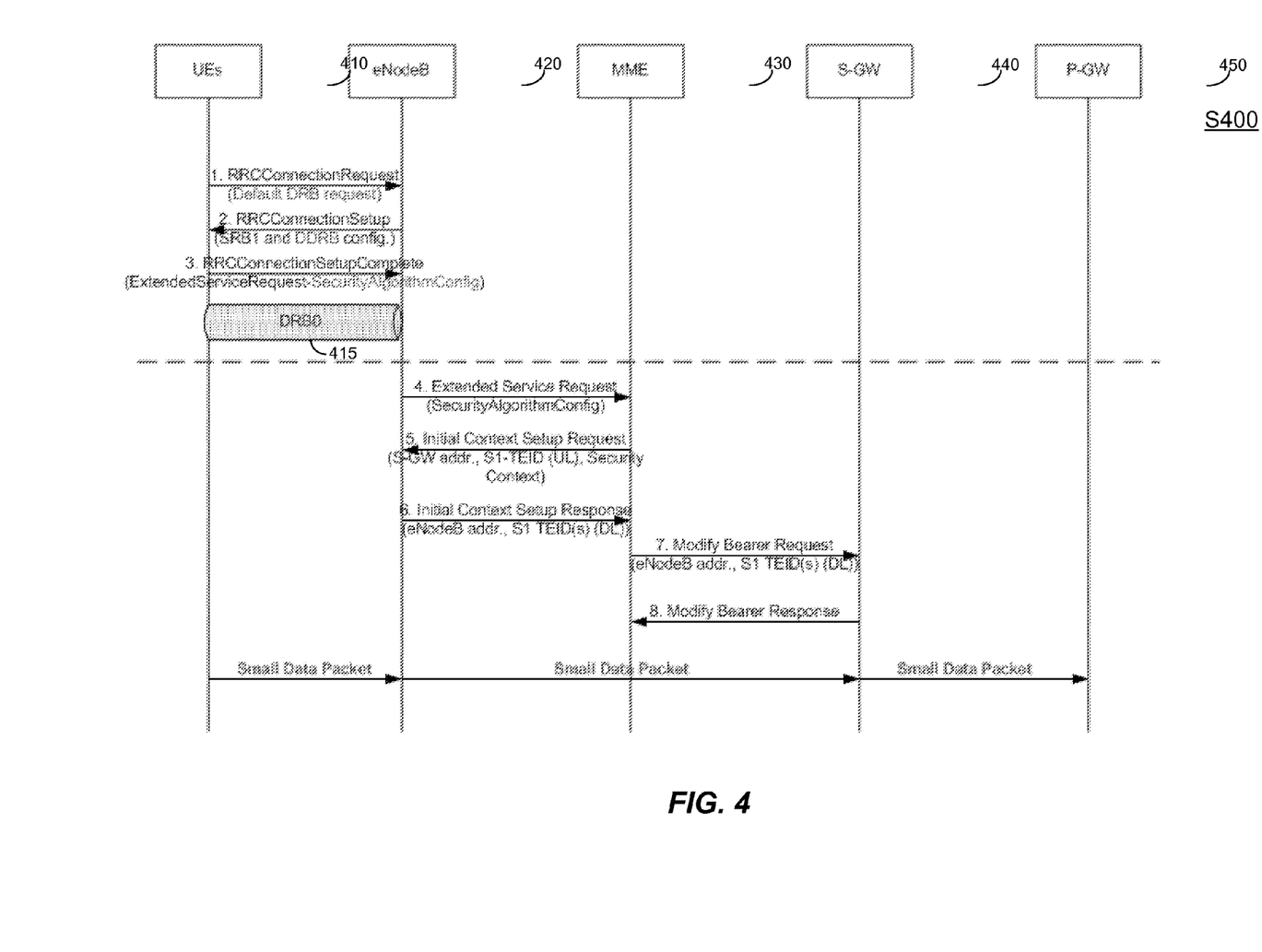
FIG. 4 illustrates a call flow for mobile-originated small data transmission in accordance with various embodiments of the disclosure.

FIG. 4 illustrates a call flow S400 for mobile-originated small data packet transmission according to various embodiments of the disclosure. With reference to FIGS. 1-4, at step 1, a user equipment (UE) 410 (which, for instance, may be similar to or include one or components of the UE 310 or the like) sends a connection request, for a transmitter module (e.g., 280) to a base station, such as (but not limited to) an eNodeB 420 (which, for instance, may be similar to or include one or more components of the eNodeB 320), or the like. According to various embodiments, the UE 410 is a wireless communication device. In particular embodiments, the UE 410 is a machine-type communication (MTC) device. In some embodiments, the connection request contains a request for a signal radio bearer (SRB).

The connection request may be a message containing a request for a default data radio bearer (DRB) (also referred to as DDRB or DRB0), which is preconfigured at the eNodeB 420 for use as a default DRB. The terms "default DRB" and "preconfigured DRB" may be used interchangeably, unless otherwise noted. According to various embodiments, the default DRB is a short-lived DRB for handling a small data packet transmission.

In particular embodiments, the connection request is a radio resource control (RRC) Connection Request message. In some embodiments, an establishment cause in the RRC Connection Request specifies the request for the default DRB (e.g., establishment cause=mo-Data-DDRB). In other embodiments, a flag is added to the RRC Connection Request message.

At step 2, the eNodeB 420 sends a message, such as (but not limited to) an RRC Connection Setup message, which includes configuration information for the SRB, to the UE 410. The RRC Connection Setup message also includes configuration information for the default DRB. Thus, according to various embodiments, in response to the connection request by the UE 410, the UE 410 receives, for example via a receiver module (e.g., 220), the default (preconfigured) DRB and the SRB from the eNodeB 420.

At step 3, the UE 410 sends a message, such as (but not limited to) an RRC Connection Setup Complete message, to the eNodeB 420. The RRC Connection Setup Complete message includes an Extended Service Request (ESR) and security configuration information (Security Algorithm Configuration). Accordingly, DRB 415 is established between the UE 410 and the eNodeB 420.

At step 4, the eNodeB 420 forwards an Extended Service Request (ESR) message (corresponding to the ESR in the RRC Connection Setup Complete message) to a network control entity, such as (but not limited to) a mobility management entity (MME) 430.

In various embodiments, the ESR message introduces a new Service Type, e.g., small-data-transmission. The ESR message includes the security configuration information (Security Algorithm Configuration) so that access stratum (AS) security can be established without the SecurityModeCommand/Complete exchanges.

At step 5, the MME 430 sends a message, such as (but not limited to) an Initial Context Setup Request message to the eNodeB 420. The Initial Context Setup Request message includes information such as address of S-GW (Serving Gateway) 440, S1 tunnel identification for uplink of an S1 tunnel, and security context information (e.g., the security configuration information).

Thus, according to various embodiments, the UE 410 provides security information to the MME 430 (or other network controller), which then may be provided to the eNodeB 420. Unlike the prior art in which the security configuration information is determined by the MME (e.g., 330 in FIG. 3), the security configuration information is determined by the UE 410, thus eliminating the need for SecurityModeCommand/Complete message exchanges.

In some embodiments, the last used (or other preselected) security configuration information can be proposed by the UE 410 to the MME 430. In some embodiments, the security configuration information proposed by the UE 410 to the MME 430 may be preconfigured during an attach/TAU (tracking area update) procedure. In such embodiments, the ESR message does not need to contain the proposed security configuration information.

According to various embodiments, to support multiple MTC access point names (APNs), an index and/or code associated with the desired APN is added. The index and/or code can be assigned to the UE 410 by the MME 430 when packet data network (PDN) connections are established. According to various embodiments, the Initial Context Setup Request message specifies that there is no need to further activate DRB(s) and no need for SecurityModeCommand/Complete as the UE 410 already has proper security key(s) for RRC signaling, user plane, non-access stratus signaling (e.g., $K_{RRCint}$, $K_{RRCenc}$, $K_{UPenc}$, etc.).

In various embodiments, the message (e.g., the message of step 3) may be a non-access stratus (NAS) message. Thus, according to various embodiments, in response to receiving the default DRB, the UE 410 sends an NAS message to the MME 330, which is then sent to the eNodeB 420. The NAS message may be an ESR message. The NAS may include the security configuration information. The NAS message may include an access point name (APN) and/or an index to the APN to be associated with the default DRB.

At step 6, the eNodeB 420 sends a message, such as (but not limited to) an Initial Context Setup Response message to the MME 430. The Initial Context Setup Response message includes information such as the address of the eNodeB 420 and S1 tunnel identification for downlink of the S1 tunnel. At step 7, the MME 430 sends a Modify Bearer Request message to the S-GW 440. The Modify Bearer Request message includes information such as the address of the eNodeB 420 and S1 tunnel identification for downlink of the S1 tunnel. At step 8, the S-GW 440 sends a message, such as (but not limited to) a Modify Bearer Response message to the MME 430 to establish the S1 tunnel 425 between the eNodeB 420 and the S-GW 440. In comparison with the call flow S300, four over-the-air signaling messages (at steps 6-9 of the call flow S300) for setting up a DRB can be eliminated.

In various embodiments, the UE 410 is configured to determine whether the MME 430 and/or the S-GW 440 support(s) the configuration of the call flow S400. In some embodiments, the UE 410 can learn about the network's support of this configuration during the attach/TAU procedure. During the attach/TAU procedure, the UE 410 and MME 430 can also exchange other information such as E-RAB (E-UTRAN radio access bearer) to be associated with the default DRB, rules to regulate the usage of this feature (e.g., maximum packet size that can use this feature, etc.), and/or the like.

In various embodiments, the UE 410 is configured to determine whether the eNodeB 420 supports the configuration of the call flow S400. In some embodiments, if the MME 430 supports this configuration, this could imply all eNodeBs (e.g., eNodeB 420) under the MME 430 support this configuration per 3GPP convention. If some eNodeBs do not support this feature, such eNodeBs can ignore the default DRB request and the normal DRB setup procedure will follow. That is, the eNodeB 420 does not configure the default DRB in the RRC Connection Setup message. In some embodiments, the eNodeB 420 can broadcast its capability in a system information block (SIB) message.

In various embodiments, the MME 430 and/or the eNodeB 420 are configured to determine the EPS Bearer ID associated with the default DRB. According to some embodiments, for the MME 430, the UE 410 communicates the associated EPS Bearer (and associated MTC APN) to the MME 430 using a non-access stratum (NAS) procedure (e.g., attach, TAU). According to some embodiments, for the eNodeB 420, because the default DRB is autonomously configured by the eNodeB 420, there must be a known EPS bearer information (e.g., eps-BearerIdentity, QoS (quality of service) parameters, etc.) at the eNodeB 420. This can be pre-configured at the eNodeB 420 and is consistent with the information that the MME 430 has. The eNodeB 420 may confirm this from the Initial Context Setup Request message from the MME 430.

In general, the UE 410 may not know when the eNodeB 420 is ready to process one of its packets, such as an uplink (UL) packet (i.e., the UE 410 does not have visibility on the time that the eNodeB 420 receives the Initial Context Setup Request message). Accordingly, in various embodiments, the UE 410 is configured to determine when to send the UL packet to the eNodeB 420. In some embodiments, the eNodeB 420 does not allocate any UL grant until the eNodeB receives the Initial Context Setup Request message from the MME 430. Once the UE 410 receives the grant, the UE 410 sends the small data packet to the eNodeB. In other embodiments, the eNodeB 420 allocates necessary UL grant even before the eNodeB 420 receives the Initial Context Setup Request message from the MME 430. In this case, the eNodeB 420 has to buffer the UL small data packet for a short period of time. Once the eNodeB 420 gets the Security Context from the MME 430, the eNodeB 420 decrypts the packet and forwards the decrypted packet to the S-GW 440 over the S1 tunnel identified in the Initial Context Setup Request message.

Figure 5:
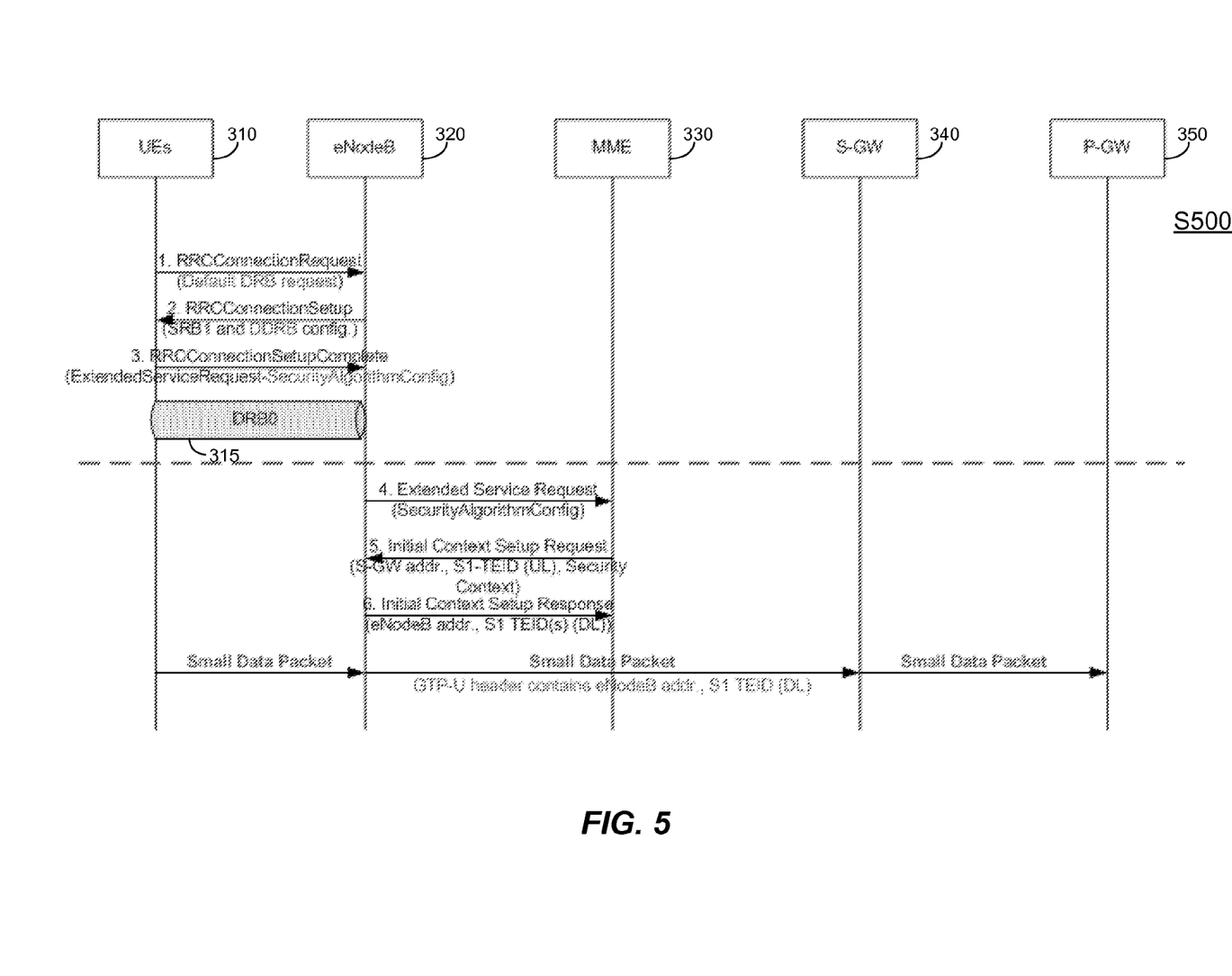
FIG. 5 illustrates a call flow for mobile-originated small data transmission in accordance with various embodiments of the disclosure.

FIG. 5 illustrates a call flow 5500 for mobile-originated small data packet transmission according to various embodiments of the disclosure. With reference to FIGS. 4 and 5, the call flow 5500 is generally similar to the call flow 5400 except that an uplink grant is allocated to the UE 410. In particular embodiments, the uplink grant is allocated by providing the S1 tunnel identification (TEID(s)) for downlink (DL) of the S1 tunnel (to the S-GW 440) in a header of a data packet. Such embodiments, for instance, may eliminate the need for the Modify Bearer Request message (e.g., step 7 in the call flow S400) and the Modify Bearer Response message (e.g., step 8 in the call flow S400) between the MME 430 and the S-GW 440. In particular embodiments, the header may include a field for the TEID for downlink of the S1 tunnel.

In various embodiments, the data packet may be (but is not limited to) a GTP-U (GPRS tunnel protocol user data tunneling). In some embodiments, the GTP-U header contains an IP address of the eNodeB 420 and TEID (DL) so that downlink transmission is possible. In particular embodiments, the eNodeB 420 may send a dummy/empty GTP-U packet where the header contains a special eNodeB IP address and/or TEID (DL) indicating the release of the default DRB. Until the S-GW 440 receives the dummy GTP-U packet, the S-GW 440 may forward downlink data packet(s) to the eNodeB 420 addressed to the TEID (DL). After the S-GW 440 receives this dummy GTP-U packet, the S-GW 440 sends DL Data Notification to the MME 430 for any DL data packets.

In some embodiments, the uplink grant is allocated to the UE 410 after the eNodeB 420 receives the security configuration information from the MME 430. In other embodiments, the uplink grant is allocated to the UE 410 before the eNodeB 420 receives the security configuration information from the MME 430. In various embodiments, the eNodeB 420 may buffer uplink data packets until the security configuration information is received (from the MME 430). The eNodeB 420 may process the uplink data packets based on the received security configuration information.

Figure 6:
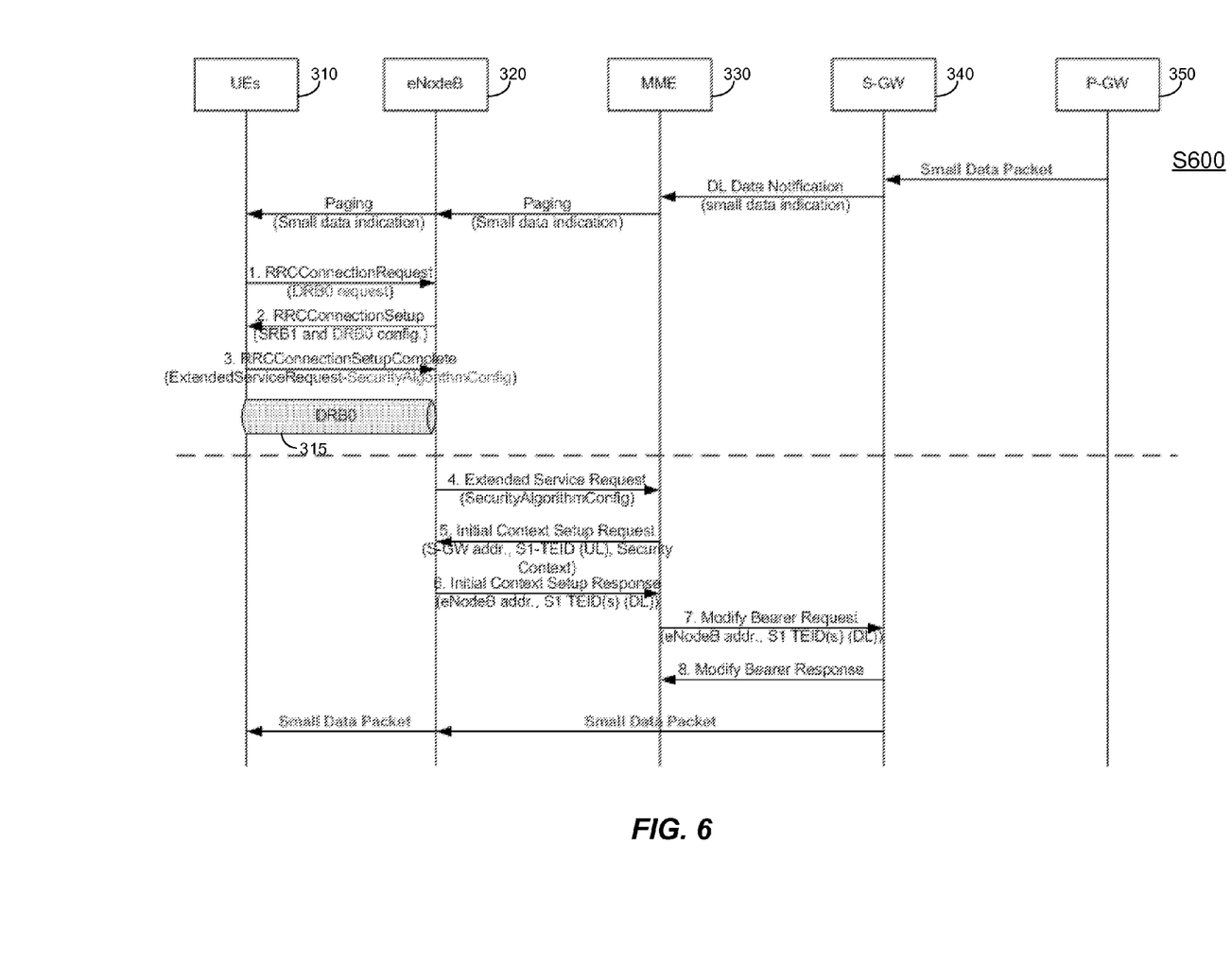
FIG. 6 illustrates a call flow for mobile-terminated small data transmission in accordance with various embodiments of the disclosure.

FIG. 6 illustrates a call flow S600 for mobile-terminated small data packet transmission according to various embodiments of the disclosure. With reference to FIGS. 4-6, the call flow S600 may be similar to the call flow S400 and/or the call flow S500 except that the call flow S600 is in response to a paging request message from the P-GW (PDN gateway) 450 to the S-GW 440 (small data packet) to the MME 430 (DL Data Notification) to the eNodeB 420 to the UE 410. The paging request message may indicate an upcoming mobile-terminated small data transmission.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of transmitting data packets with a wireless communication device, the method comprising:
    sending a request for a preconfigured data radio bearer (DRB) to a base station during a connection request;
    receiving the preconfigured DRB from the base station in response to the request; and
    providing security configuration information to a mobility management entity (MME) that provides the security configuration information to the base station.

2. The method of claim 1, wherein the wireless communication device is a machine-type communication (MTC) device.

3. The method of claim 1, wherein the base station is an eNodeB.

4. The method of claim 1, wherein the connection request comprises a radio resource control (RRC) Connection Request.

5. The method of claim 1, the method further comprising: sending a request for a signal radio bearer (SRB) from the base station during the connection request.

6. The method of claim 5, the method further comprising: receiving the SRB from the base station in response to the request for the SRB.

7. The method of claim 1, wherein the security configuration information is provided to the MME via the base station.

8. The method of claim 1, the method further comprising: sending a confirmation to the base station in response to receiving the preconfigured DRB.

9. The method of claim 1, the method further comprising: sending a non-access stratus (NAS) message destined to the the MME to the base station in response to receiving the preconfigured DRB.

10. The method of claim 9, wherein the NAS message is an extended service request message.

11. The method of claim 9, wherein the NAS message includes the security configuration information.

12. The method of claim 9, wherein the NAS message includes an access point name (APN) to be associated with the preconfigured DRB.

13. The method of claim 9, wherein the NAS message includes an index to an access point name (APN) to be associated with the preconfigured DRB.

14. The method of claim 1, wherein providing the security configuration information comprises selecting a previously used security configuration information.

15. The method of claim 1, wherein the preconfigured DRB is received before the security configuration information is provided to the MME.

16. The method of claim 1, wherein the method is used for data transmissions originating at the wireless communication device.

17. The method of claim 1, wherein the method is used for data transmissions terminating at the wireless communication device.

18. The method of claim 1, wherein the preconfigured DRB is requested in response to receiving a paging request.

19. The method of claim 1, the method further comprising: determining whether one or more of the base station and the MME supports the method.

20. An apparatus for transmitting data packets, the apparatus comprising:
    a transmitter module for sending a request for a preconfigured data radio bearer (DRB) to a base station during a connection request; and
    a receiver module for receiving the preconfigured DRB from the base station in response to the request;
    the transmitter module for providing security configuration information to a mobility management entity (MME), which provides the security configuration information to the base station.

21. An apparatus for transmitting data packets, the apparatus comprising:
    a transmitter means for sending a request for a preconfigured data radio bearer (DRB) to a base station during a connection request; and
    a receiver means for receiving the preconfigured DRB from the base station in response to the request;
    the transmitter means for providing security configuration information to a mobility management entity (MME), which provides the security configuration information to the base station.

22. An apparatus for transmitting data packets, the apparatus comprising:
    an electronic processor;
    a memory comprising processor executable code and/or data, the processor executable code, when executed by the processor, configures the apparatus to:
        sending a request for a preconfigured data radio bearer (DRB) to a base station during a connection request;
        receive the preconfigured DRB from the base station in response to the request; and
        provide security configuration information to a mobility management entity (MME), which provides the security configuration information to the base station.

23. A method of transmitting data packets via a base station, the method comprising:
    receiving a request for a preconfigured data radio bearer (DRB) from a wireless communication device during a connection request;
    sending the preconfigured DRB to the wireless communication device in response to the request;
    receiving security configuration information from a mobility management entity (MME), wherein the security configuration information is provided from the wireless communication device to the MME; and
    allocating uplink grant to the wireless communication device.

24. The method of claim 23, wherein the wireless communication device is a machine-type communication (MTC) device.

25. The method of claim 23, wherein allocating uplink grant to the wireless communication device comprises transmitting a tunnel endpoint ID for downlink (TEID DL) to a serving gateway in a header of a data packet.

26. The method of claim 25, wherein the header includes an IP address of the base station.

27. The method of claim 25, wherein the data packet is a general packet radio service (GPRS) tunneling protocol-user (GTP-U) data packet.

28. The method of claim 25, wherein the header includes a field for the TEID DL.

29. The method of claim 23, wherein the base station is an eNodeB.

30. The method of claim 23, wherein the connection request comprises a radio resource control (RRC) Connection Request.

31. The method of claim 23, wherein the allocating the uplink grant to the wireless communication device occurs before the base station receives the security configuration information from the MME.

32. The method of claim 23, wherein the allocating the uplink grant to the wireless communication device occurs after the base station receives the security configuration information from the MME.

33. The method of claim 23, wherein the base station buffers uplink data packets until the security configuration information is received and processes the data packets based on the security configuration information.

34. The method of claim 23, the method further comprising:
receiving a request for a signal radio bearer (SRB) from the wireless communication device during the connection request.

35. The method of claim 24, the method further comprising:
providing the SRB to the wireless communication device in response to the request.

36. The method of claim 23, wherein the preconfigured DRB is provided to the wireless communication device before the security configuration information is provided to the MME.

37. An apparatus for processing data packets, the apparatus comprising:
a receiver module for receiving a request for a preconfigured data radio bearer (DRB) from a wireless communication device during a connection request; and
a transmitter module for sending the preconfigured DRB to the wireless communication device in response to the request;
the receiver module for receiving security configuration information from a mobility management entity (MME), wherein the security configuration information is provided from the wireless communication device to the MME;
the transmitter module for allocating uplink grant to the wireless communication device.

38. An apparatus for processing data packets, the apparatus comprising:
a receiver means for receiving a request for a preconfigured data radio bearer (DRB) from a wireless communication device during a connection request; and
a transmitter means for transmitting the preconfigured DRB to the wireless communication device in response to the request;
the receiver means for receiving security configuration information from a mobility management entity (MME), wherein the security configuration information is provided from the wireless communication device to the MME;
the transmitter means for allocating uplink grant to the wireless communication device.

39. An apparatus for processing data packets, the apparatus comprising:
an electronic processor;
a memory comprising processor executable code and/or data, the processor executable code, when executed by the processor, configures the apparatus to:
receive a request for a preconfigured data radio bearer (DRB) from a wireless communication device during a connection request;
transmit the preconfigured DRB to the wireless communication device in response to the request;
receive security configuration information from a mobility management entity (MME), wherein the security configuration information is provided from the wireless communication device to the MME; and
allocate uplink grant to the wireless communication device.

* * * * *